V. FRANK.
SPEEDOMETER AND MILEAGE INDICATOR.
APPLICATION FILED SEPT. 29, 1908.
1,049,220.
Patented Dec. 31, 1912.
2 SHEETS—SHEET 1.
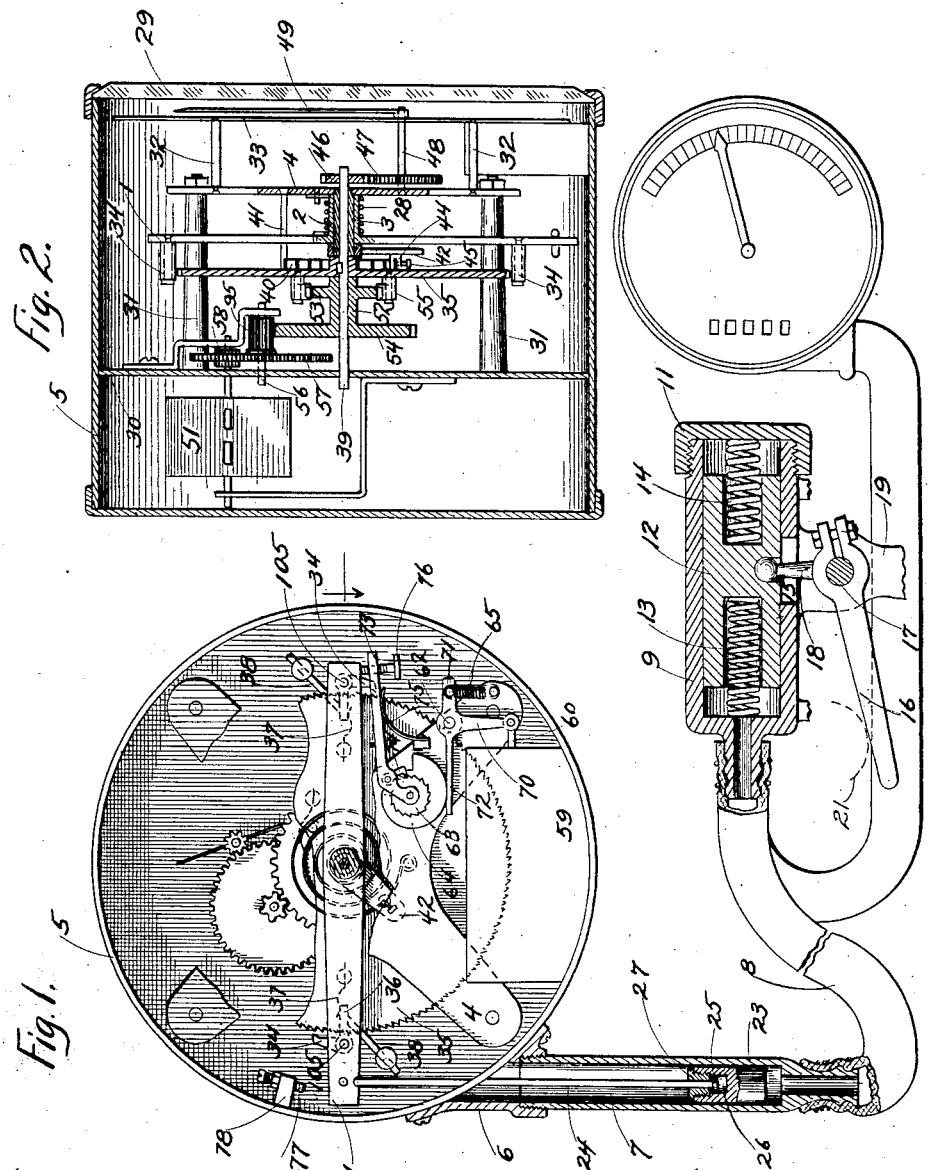

V. FRANK.
SPEEDOMETER AND MILEAGE INDICATOR.
APPLICATION FILED SEPT. 29, 1908.

1,049,220.

Patented Dec. 31, 1912.
2 SHEETS—SHEET 2.

Witnesses:

Inventor:
Vincent Frank
By Sheridan H. Wilkinson
Att'ys

UNITED STATES PATENT OFFICE.

VINCENT FRANK, OF CHICAGO, ILLINOIS, ASSIGNOR TO SHAFTLESS SPEEDOMETER COMPANY, OF CHICAGO, ILLINOIS, A CORPORATION OF SOUTH DAKOTA.

SPEEDOMETER AND MILEAGE-INDICATOR.

1,049,220. Specification of Letters Patent. Patented Dec. 31, 1912.

Application filed September 29, 1908. Serial No. 455,249.

*To all whom it may concern:*

Be it known that I, VINCENT FRANK, a citizen of the United States, residing at Chicago, in the county of Cook and State of Illinois, have invented certain new and useful Improvements in Speedometers and Mileage-Indicators, of which the following is a specification.

The object of my invention is to provide a speedometer and mileage counter especially adapted for use upon automobiles, but applicable to other uses.

In connection with my improved speedometer and counting mechanism, and forming part thereof, I have invented improved means for transmitting movement thereto from the vehicle wheel.

The precise nature of my improvements and the scope of my invention will more clearly appear from the following description and claims, taken in connection with the drawings forming part of this application.

Figure 3:
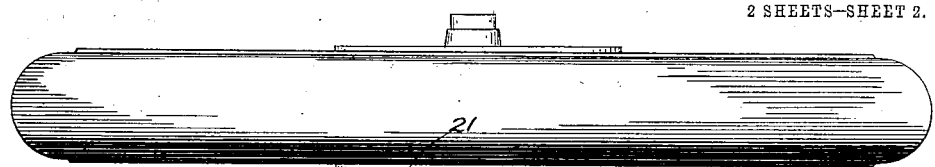
Figure 4:
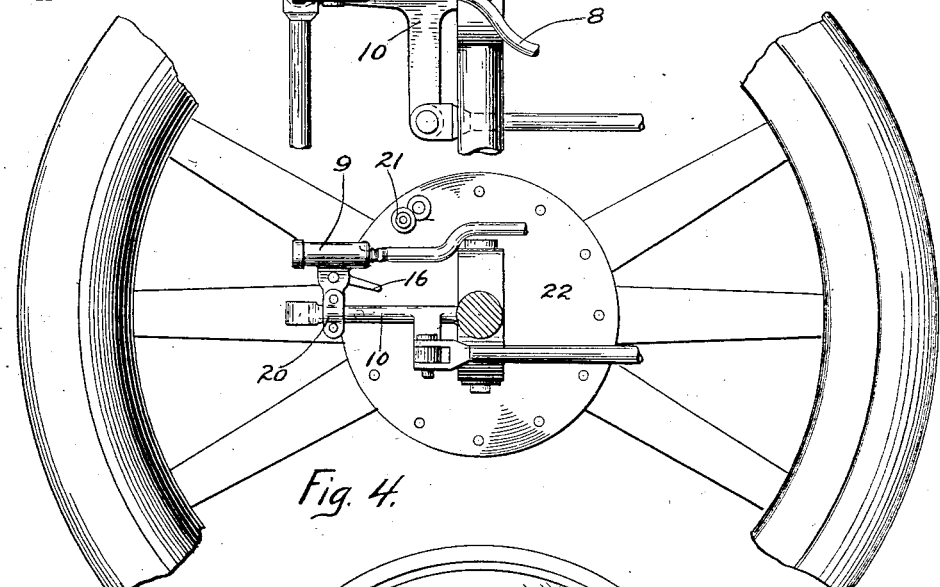
Figure 5:
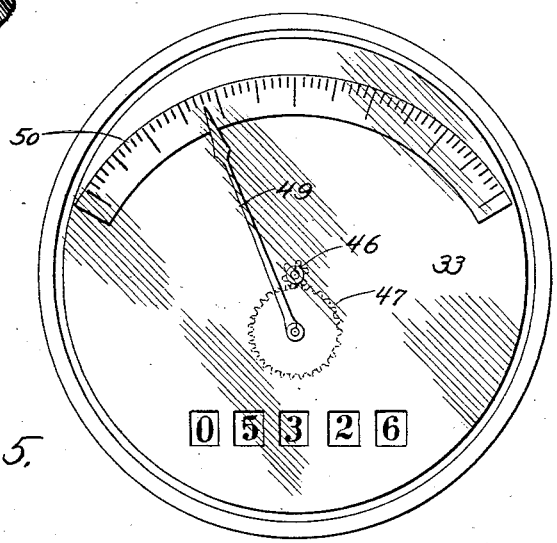

In the drawings—Figure 1 is a sectional view through the speedometer and pneumatic transmission device. Fig. 2 is a section through part of the mechanism at a right angle to the section shown in Fig. 1. Fig. 3 is a fragmentary view showing the part of the mechanism mounted adjacent the vehicle wheel. Fig. 4 is an elevational view of the parts shown in Fig. 3. Fig. 5 is a face view of the speedometer and counting mechanism.

The speedometer and counting mechanism are actuated by an oscillating arm 1 which is provided with a hub 2 pivotally mounted upon a sleeve 3 which is secured by riveting or otherwise to the plate 4 forming part of the inside frame of the machine. I will first describe the means whereby movement is communicated to the oscillating arm 1 from the vehicle wheel. Mounted upon the cylindrical casing 5 is a screw threaded nipple 6 into which is threaded a cylinder 7, these parts being mounted, of course, upon the dash-board or other convenient part of the vehicle. The cylinder 7 is connected by a pipe 8, which may be ordinary rubber or other tubing, with a second cylinder 9 mounted upon the steering knuckle 10 of the automobile. In case the invention is applied to vehicles of other descriptions, the cylinder 9 will be mounted in any convenient manner adjacent one of the wheels. The end of the cylinder 9 opposite its connection with the pipe 8 is closed by means of a screw threaded cap 11, and a plunger 12 is fitted to and adapted to oscillate in said cylinder 9. The plunger 12 is held in an intermediate position by means of springs 13 and 14, the spring 14, preferably, being somewhat stronger than the spring 13. In its lower side the cylinder 9 is provided with an aperture 15, the plunger 12, however, being of such length that said aperture is never uncovered. A bell crank lever 16—18 is pivoted at 17 to an extension of the cylinder 9, and the arm 18 of said bell crank lever passes through the aperture 15 and is provided with a rounded end coacting with a rounded cavity in the side of the plunger 12. The extension 19 is provided at its lower end with a clamp 20 of an ordinary type through which, by means of screws, the cylinder 9 may be firmly secured to the steering knuckle 10. The arm 16 of the bell crank lever projects into the path of a roller 21, mounted upon the disk 22 of the wheel, each rotation of the wheel thereby communicating movement to the bell crank as said roller contacts with the arm 16. The movement of the bell crank 16—18—as above described—impels the plunger 12 to the left as viewed in Fig. 1. The length of the springs 13—14 are so proportioned that the plunger 12 normally occupies the intermediate position shown in Fig. 1. In the cylinder 7 is a second plunger 23 which, through a stem 24, is operatively connected to the end of the oscillating arm 1. The stem 24 is illustrated as provided with a head 25. The end of the plunger 8 is provided with a recess 26 and a screw threaded plug 27 provided with a central aperture is passed over the stem 24 and screwed into the end of the plunger 23, sufficient space being left between the inner end of said plug and the base of the recess to provide a small amount of lost motion between the stem 24 and said plunger 23.

The movement of the plunger 12 to the left, as viewed in Fig. 1, has the effect of compressing the air in the tube 8, and communicating an outward movement to the plunger 23 thus causing the arm 1 to oscillate, thereby actuating the speedometer and counting mechanism. The bell crank 16—18 after being impelled to the left returns to its normal position under the impulse of the spring 13, thus permitting the plunger 23 to return to its normal position, such return being assisted by the coiled spring 28 secured at one end to the frame 4 and at its opposite end to the arm 1, as illustrated in Fig. 2. This spring tends to return the arm 1 to the position shown in Fig. 1, thereby assisting in the return of the plunger 23 to the position shown in that view. As the vehicle wheel rotates, a succession of impulses are communicated to the air in the pipe 8, thereby causing the plunger 23 and arm 1 to oscillate once for each rotation of the vehicle wheel. A similar action is caused when the vehicle is moved in the reverse direction, the roll 21 striking the opposite side of the arm 16 and moving the plunger 12 to the right from the position shown in Fig. 1, thereby causing a slight reduction in pressure in the pipe 8 followed by a slight compression upon the return stroke of the plunger 12. It is probable that in both directions of movement of the vehicle there is both a reduction and increase of pressure in the pipe 8, for the reason that the plunger 12 after being moved from its normal position probably returns somewhat beyond the normal before coming to rest. However this may be, I have found in practice that the device is operative in both directions of movement.

The means of transmitting power from the vehicle wheel to the speedometer and counting mechanism above described dispenses with the use of flexible shafts and other cumbersome or expensive mechanism, while at the same time providing a reliable and positive means of actuating the device.

Proceeding now to a description of the speed registering and counting mechanism, the same is inclosed in a cylindrical casing 5, provided with a glass front 29. The mechanism is mounted upon a frame consisting of a plate 30 connected to which, by means of posts 31, is a second plate 4, which through posts 32 supports the dial 33. The arm 1 is provided at its ends with pawls 34 adapted to coact with a main wheel 35, which is provided upon its periphery with ratchet teeth. The pawls 34 are pivoted to the arm 1 at 105 and are provided with extensions 36, and springs 37 secured to the arm 1 press against said extensions 36 tending to throw the pawls 34 into engagement with the ratchet wheel 35. Stops 38 are mounted upon the frame of the machine and adapted to contact with the extensions 36 and throw the pawls 34 out of engagement with the ratchet wheel 35 before the arm 1 is returned to its normal position under the impulse of spring 28, as illustrated in Fig. 1.

Upon communication of movement to the plunger 23 by a pneumatic impulse, the arm 1 will be moved clockwise, as viewed in Fig. 1, thus carrying the pawls 34 out of engagement with the stops 38 and permitting them to engage and communicate movement to the ratchet wheel 35. By this means provision is made for communicating a series of rotative impulses to the ratchet wheel 35, one such impulse occurring upon each revolution of the vehicle wheel.

A shaft 39 is pivotally mounted in the plates 4 and 30 and the wheel 35 is fixedly secured to said shaft. A spring 40 is secured at its inner end to the hub of the wheel 35 and at its outer end to a stationary post 41 secured to the plate 4 or other convenient part of the frame. The tendency of this spring is to rotate the wheel 35 in a direction opposite the movement communicated by the pawls upon the arm 1. The tension of the spring 40 is adjusted by means of an arm 42 pivoted upon the sleeve 3 and carrying a split stud 44 embracing one of the coils of said spring. A set screw 45 may be provided if desired for securing said stud to the spring. The tension of the spring may be adjusted by rotating the arm 42 upon its bearing.

The mechanism so far described will operate in the following manner: Referring to Fig. 1, a succession of impulses in a clockwise direction will be communicated to the wheel 35 by the pawls 34 upon the arm 1, and between said impulses the spring 40 will tend to restore the wheel 35 to its normal position. The parts are so proportioned, however, and the action of the spring is so restrained by mechanism hereinafter described that the spring will not completely restore the wheel 35 to normal position between the impulses communicated by the pawls 34, and the more frequently such impulses are communicated by the pawls 34, due to the speed of the vehicle, the farther the wheel 35 will be moved from normal position, due to the difference between the angular action communicated by the spring and that communicated by the pawls at each impulse. The position of the wheel 35 will, therefore indicate the frenquency of the impulse and hence the speed of rotation of the vehicle wheel. Upon its forward end the shaft 39 is provided with a pinion 46 meshing with a gear 47 mounted upon a shaft 48 which is journaled at its ends in the plate 4 and dial 33, respectively. At its outer end the shaft 48 carries a pointer 49 which coacts with a graduated scale 50 upon the dial. The wheel 35 being secured to the shaft 39, its position and therefore the speed of the vehicle will be indicated by the position of the pointer 49. It will be understood, of course, that the scale 50 will be properly calibrated in order that the speed may be read in miles per hour.

In order to dampen and govern the action of the spring 40, I provide a fan 51, the shaft of which, through intermediate gearing and pawl and ratchet mechanism, is connected to said wheel 35, the pawl and ratchet mechanism being so disposed that the fan is rotated when the wheel 35 is rotated by the spring 40. Sleeve 52 carries at one end a ratchet wheel 53 and at the other end a gear 54. Pawls 55 mounted upon wheel 35 are adapted to communicate movement to the ratchet wheel 53 when the wheel 35 moves under the impulse of the spring 40. Through the gear 54 and pinion 95, movement is communicated to a counter shaft 56, which is provided with a gear 57, and meshing in turn with a pinion 58 upon the shaft of the fan 51. Through proper proportioning of the train of gearing, the size of the fan 51 and strength of the spring 40, the range of movement of the pointer 49 between maximum and minimum speeds may be regulated.

The counting mechanism for registering the mileage traveled may be of any ordinary type now in use, and I therefore represent such mechanism diagrammatically, showing in detail only the connections of my improved mechanism therewith. Referring to Fig. 1, the casing 59 of the counting mechanism is placed within the cylindrical casing 5, and the arm 60 projecting therefrom is the initial operating member thereof, serving to transmit motion to the counting wheels—not shown—within. In order to actuate the member 60, I provide a three-arm lever 70—71—72 pivoted at 62 to the plate 4. Also pivoted upon the plate 4 is a ratchet wheel 63 and a cam 64 is integral with or rigidly secured to said ratchet wheel. The cam 64 is provided with a rise extending completely around the circumference and an abrupt drop. A spring 65 secured at one end to the plate 4 and at its opposite end to the arm 71 of the three-arm lever serves to hold the arm 72 of said lever in contact with the peripheral surface of the cam 64. Pivoted upon the axis of the ratchet wheel 63 is an arm 73 carrying a pawl 74 adapted to engage the teeth of said ratchet wheel. The arm 73 engages one end of the arm 1 and is adapted to be actuated thereby, thus causing the ratchet wheel 63 to rotate. The arm 73 is returned to initial position by means of a spring 75 secured to the plate 4, and a set screw 76 may be threaded into the outer end of the arm 73 in order to regulate the amount of movement communicated to the arm 73 by the arm 1.

Preferably, the parts are so proportioned that the cam 64 will be given a complete revolution for each tenth of a mile traveled by the vehicle, thus communicating a complete stroke to the arm 72 each time such distance is traversed. This movement is communicated through the arm 70 of the three-armed lever to the member 60 of the counting mechanism which will register the distance traveled in the usual manner. The indicating figures of the counting mechanism are shown in Fig. 5 of the drawings. I may provide a stop 77 consisting of a set screw threaded into a lug 78 on the interior of the casing 5, as shown in Fig. 1 to adjust the stroke of the arm 1.

While I have described a specific embodiment of my invention, the inventive idea is not confined to the specific mechanism illustrated, as in many instances equivalents may be substituted for the mechanism shown without departing from the principle of operation herein set forth. It will also be apparent that my pneumatic transmission provides a simple means of providing more than one speedometer in the same vehicle by running several branch pipes from the cylinder 9 or tube 8 to different parts of the vehicle where the speedometers are located.

I claim:

1. In combination, a vehicle, a rotating element, a spring tending to impel said rotating element in one direction, an oscillating member provided with means for impelling said rotating element in the opposite direction, a fan geared to said rotating element for restraining the action of said spring, and means for communicating movement to said oscillating member from one of the wheels of the vehicle.

2. In combination, a vehicle, a rotating element, a spring tending to impel said rotating element in one direction, an oscillating member provided with means for impelling said rotating element in the opposite direction, a fan geared to said rotating element for restraining the action of said spring, and pneumatic means for communicating movement to said oscillating member from one of the wheels of the vehicle.

3. In a device of the class described, a main wheel, means for imparting impulses in one direction to said wheel, a train of gearing, pawl and ratchet mechanism connecting one end of said train to said main wheel, and a fan driven from the other end of said train.

In testimony whereof, I have subscribed my name.

VINCENT FRANK.

Witnesses:
 EDYTHE M. ANDERSON,
 FLORENCE FLORELL.

Copies of this patent may be obtained for five cents each, by addressing the " Commissioner of Patents, Washington, D. C."